United States Patent [19]

Benson

[11] 4,168,020
[45] Sep. 18, 1979

[54] DISPENSING APPARATUS FOR DISCHARGING LIQUID OR CREAMY PRODUCTS

[75] Inventor: Gustav E. Benson, Malmö, Sweden

[73] Assignee: Dispenso AG, Switzerland

[21] Appl. No.: 818,338

[22] Filed: Jul. 22, 1977

[30] Foreign Application Priority Data

Sep. 30, 1976 [SE] Sweden ............................... 7610830

[51] Int. Cl.² ............................................ B65D 47/34
[52] U.S. Cl. ....................................... 222/207; 222/478
[58] Field of Search ............... 222/209, 207, 383, 185, 222/152, 478; 220/366; 215/307

[56] References Cited

U.S. PATENT DOCUMENTS

| 3,878,972 | 4/1975 | Por | 222/207 |
| 3,952,924 | 4/1976 | Benson | 222/209 X |

Primary Examiner—John P. Shannon
Attorney, Agent, or Firm—Robert E. Burns; Emmanuel J. Lobato; Bruce L. Adams

[57] ABSTRACT

A dispensing apparatus for flowable products, comprising a replaceable container with an externally threaded neck portion, a dispensing device comprising a pump housing and a valve chamber with two valves arranged in succession in the direction of flow of the product, and a sleeve arranged to be fitted over the container neck portion so as to allow air to penetrate into the container interior along the neck threads, whereby the partial vacuum which generates above the product level inside the container during discharge of the product may be levelled out while at the same time the sealing-off against the environment is sufficient to prevent drying out of the product.

5 Claims, 4 Drawing Figures

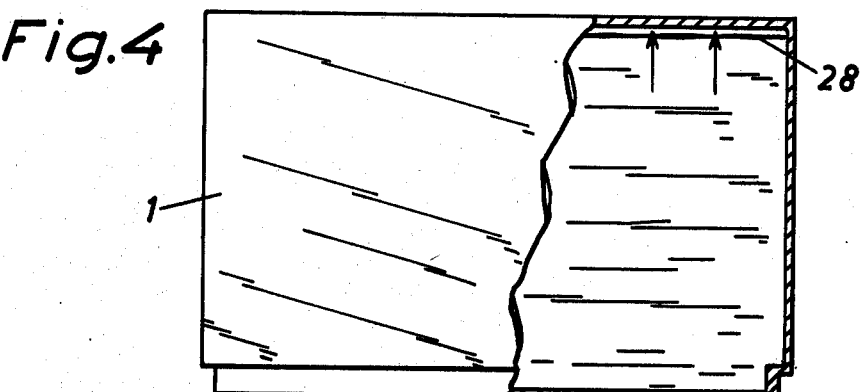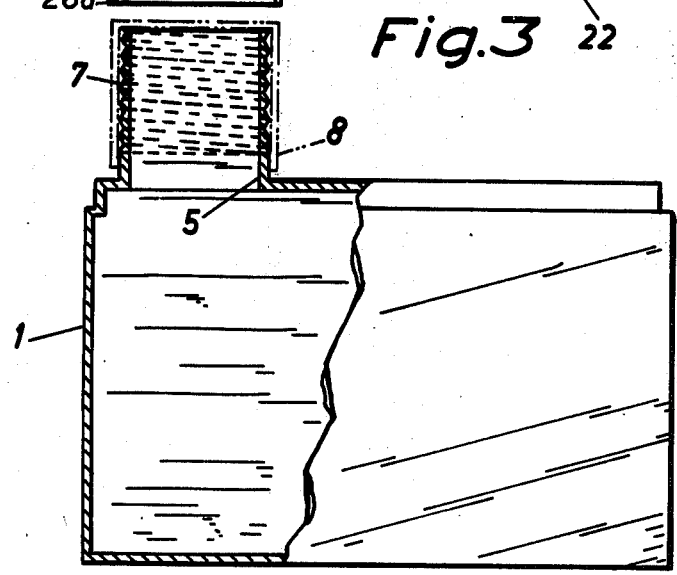

DISPENSING APPARATUS FOR DISCHARGING LIQUID OR CREAMY PRODUCTS

BACKGROUND OF THE INVENTION

The present invention relates to apparatuses designed to discharge liquid or creamy products from a container the neck portion of which is provided with external threads for engagement with a closing member, such as a screw cap. The dispensing device proper consists of a pump housing and a valve chamber having inlet and outlet means for respective intake and discharge of the product, and two valves which are arranged in succession in the direction of flow of the product and designed to close the inlet and open the outlet at the application inside the pump housing of an excess pressure, and at the occurrence inside the pump housing of a partial vacuum to open the inlet and close the outlet.

In accordance with a prior-art arrangement, the container consists of a thin-walled soft plastic tube onto the neck portion of which is screwed the inlet end of a dispensing device after removal from the neck portion of the closure member. As the contents are discharged from the tube, the latter is compressed by the surrounding air pressure, thus giving to the tube a less aesthetically pleasing appearance. The empty tube is discarded and a fresh, full one is applied on the dispensing apparatus to replace the empty one.

SUMMARY OF THE INVENTION

One of the purposes of the subject invention is to make it possible to use a container with any desired shape, preferably a parallelepipedon, made from permanent shape plastics, which container, when empty, may be refilled in a convenient manner. This is made possible in that the valve chamber is provided in front of the inlet with a sleeve-like section which is arranged to be mounted over the container neck portion, with a good fit so as to allow atmospheric air to penetrate into the container interior along the threads.

Owing to this arrangement, it becomes possible, during the discharge of the liquid or creamy product from the container, which container in position of use has its outlet opening facing downwards, to level out the partial vacuum pressure which generates above the level of the liquid inside the container by the supply of air which enters along the threads, while at the same time the sealing-off against the environment becomes sufficiently efficient, to prevent evaporation of the container contents.

BRIEF DESCRIPTION OF THE DRAWINGS

Further characteristics of the invention will become apparent upon reading of the following detailed description with reference to the accompanying drawings, wherein, FIG. 3 is a vertical sectional view through the container in the position thereof for application of the dispensing apparatus onto the container neck portion, and FIG. 4 is a similar sectional view illustrating the container and the dispensing apparatus in position of use.

DETAILED DESCRIPTION OF A PREFERRED EMBODIMENT

Figure 1:
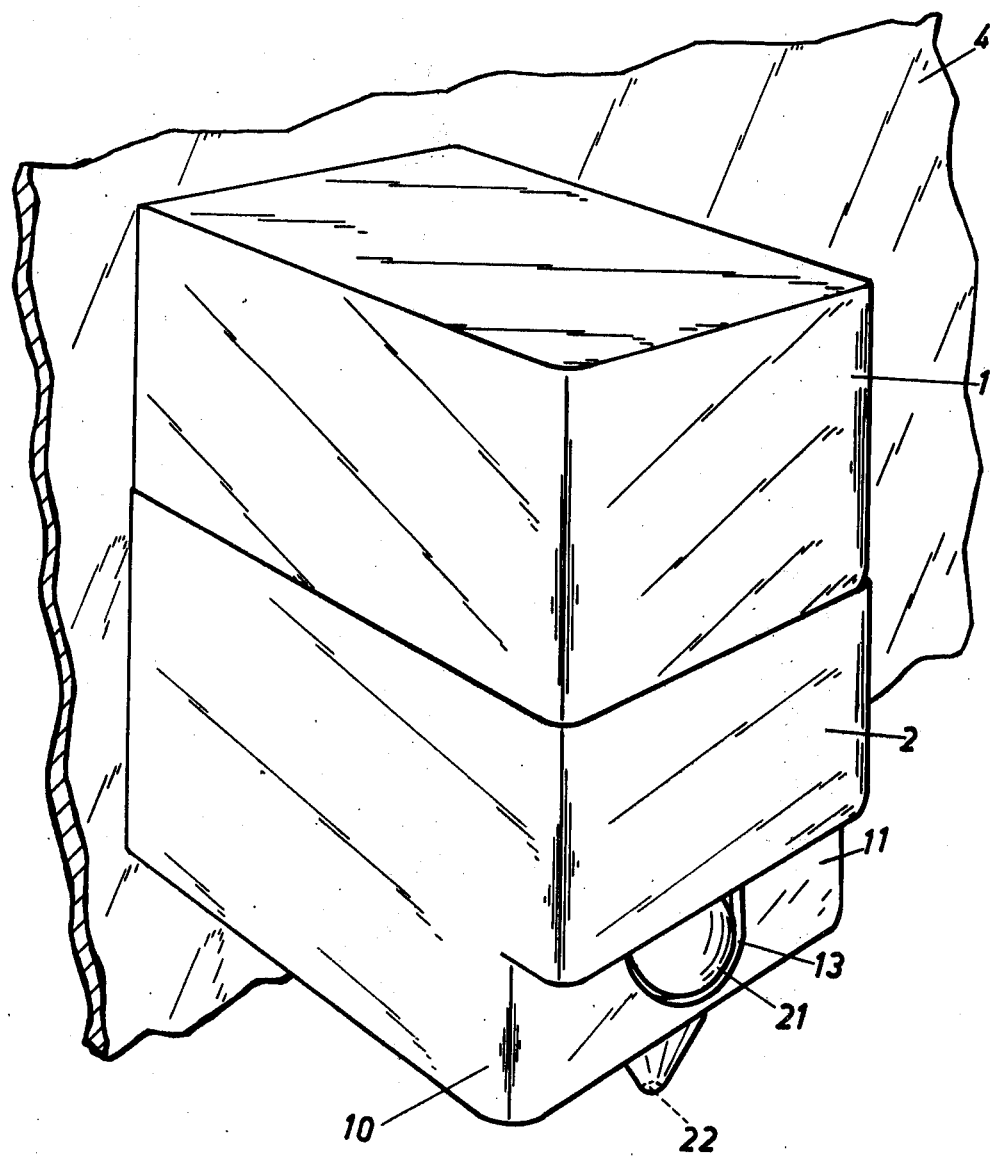
FIG. 1 is a perspective view of a dispensing apparatus in accordance with the invention, mounted on a wall.
Figure 2:
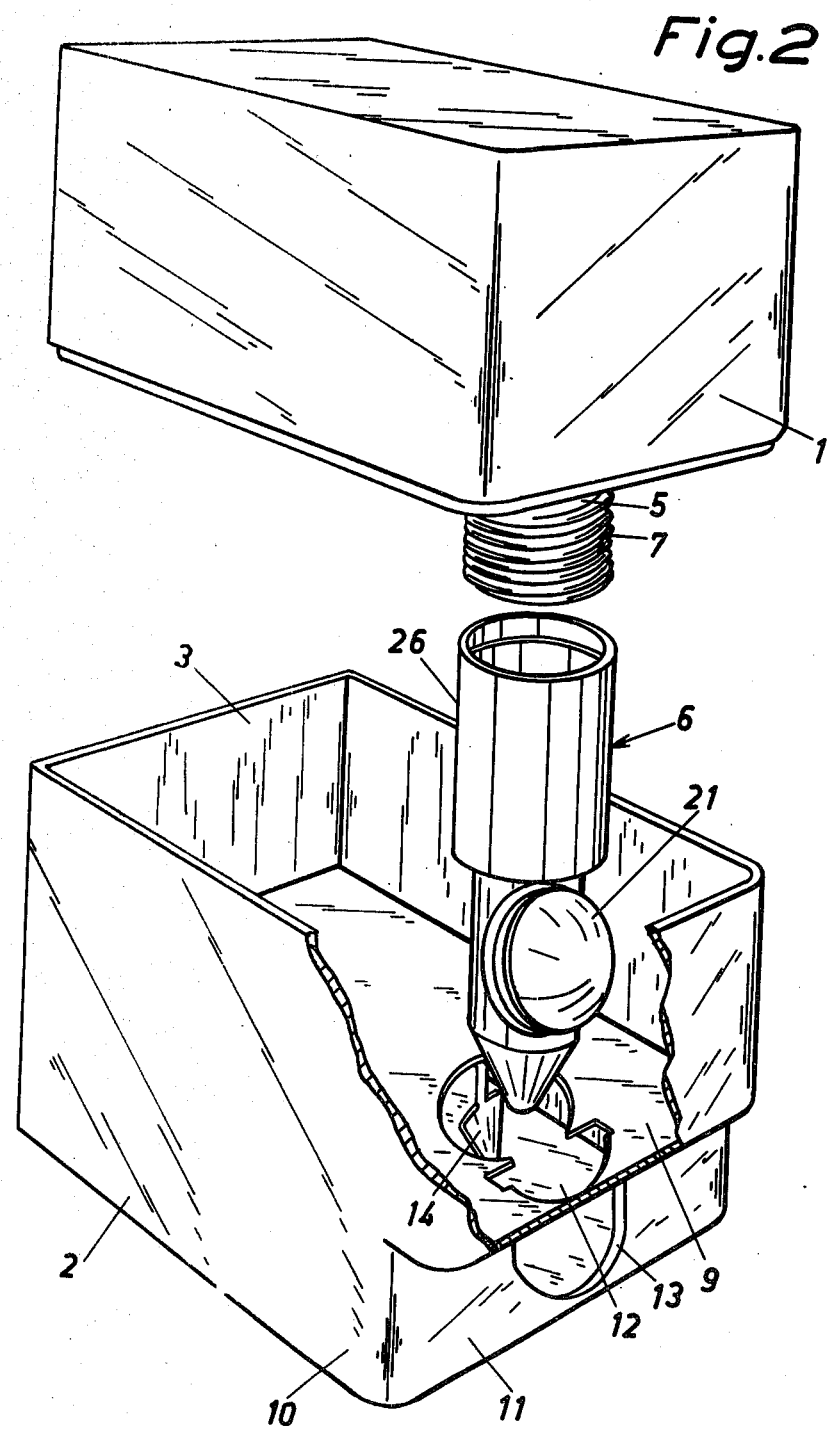
FIG. 2 shows in perspective an exploded view of the various components of the apparatus.

The dispensing apparatus illustrated in the drawings comprises three main portions, viz. a container 1 holding the liquid or creamy product, a box-like stand 2 intended to mount the container and having its one end wall 3 designed for application onto a wall 4, and a device 6 arranged to be fitted onto the neck portion 5 of the container 1 to dispense the product from the container.

The container 1 which is imagined to be made from rigid plastics, has, in the embodiment illustrated, a parallelepipedon shape. The neck portion 5 of the container has external threads 7 fitting a screw cap 8 (indicated in dash-and-dot lines in FIG. 3) and is positioned at one end of the container.

The stand has a bottom 9 below which extends a border 10. The bottom 9 and the front wall 11 of the border 10 are provided with openings 12 and 13, respectively receiving the dispensing apparatus 6 in the mounted position thereof (FIG. 1), and behind the opening 12 a member 14 supporting the dispensing device extends from the bottom 9 and downwards.

The dispensing device 6 comprises a pump housing 15 and a vertical, elongate valve chamber 16 in which are arranged two conical disc valves 17, 18, one mounted on top of the other, with the apices thereof turned upwards. In the wall 19 of the valve chamber, intermediate the two valves 17, 18, is provided a port 20 communicating the valve chamber and the pump housing 15. One wall of the latter is of a resilient material, such as rubber, so as to form a pressure bulb 21, the annular edge of which is secured to the pump housing. A discharge opening 22 is formed in the valve chamber 16, at the lower end thereof in position of use.

Into the upper end of the valve chamber (FIG. 4) extends the lower end 25 of a sleeve 26 the bottom portion 24 of which is provided with through-passage openings 23. The sleeve end 25 is secured in a liquid-tight manner, preferably through welding, to the wall of the valve chamber 16. The sleeve 26 is provided at its lower end 25 with internal stop shoulders 27 serving as spacer means and is arranged to be mounted on the container neck portion 5 with a good fit. Spaces 27a between the shoulders 27 provide passages for the flow of air as indicated by arrows in FIG. 4. Moreover, since the neck 5 of the container may have a short unthreaded portion 5a adjacent the container body, the upper end of the sleeve 26 is recessed as indicated at 26a to provide an air passage communicating with the grooves of the external threads 7 of the neck portion.

After removal of the screw cap 8 (FIG. 3) from the container 1 which is filled e.g. with liquid soap, the sleeve 26 of the dispenser device 6 is mounted on the neck portion 5 in such a manner as to ensure that the shoulders 27 abut against the outer end of the container neck 5. In this position, the end of the threads adjacent the container 1 is not sealed-off by the sleeve 26 but communicates with the surrounding air. Thereafter, the container 1 is turned upside-down and together with the dispensing device 6 it is inserted into the stand 2 which is suspended on the wall 4. In the mounted position of the device (FIG. 1), the pressure bulb 21 is easily accessible.

When by depressing the bulb 21 by one finger, a pressure is applied in the valve chamber 16 (FIG. 4), the valve 17 closes and the valve 18 opens, whereby a certain volume of soap is discharged past the marginal portions of the latter valve and out through the opening 22. After cease of the pressure on the bulb 21, the latter resumes its original position owing to its inherent resiliency, and a corresponding quantity of soap is then sucked out of the container 1 past the marginal portion of the valve 17 and down into the valve chamber 16. As the liquid level 28 inside the container gradually sinks, a partial vacuum is generated therein, which is, however, levelled out time and again in that air bubbles penetrate in between the recessed upper end portion 26a of the sleeve 26 and the neck portion 5, along the grooves of the threads 7 on the neck portion 5, in between the shoulders 27 and upwards through the neck (see the arrows in FIG. 4). While the threads make this pressure levelling possible inside the container 1, the threads at the same time prevent leakage or evaporation of the container contents.

The embodiment as described and illustrated is to be regarded as an example only and the various components of the discharging apparatus may be altered in configuration as well as structure in a variety of ways within the scope of the appended claims. Instead of using a separate sleeve 26, the dispensing device 6 may be equipped with a sleeve-like portion at the upper end of the wall 19 of the valve chamber 16. In this case, the lower end of the valve chamber should be removable in order to make possible to mount the valves 17, 18 inside the valve chamber.

What I claim is:

1. A dispensing apparatus designed to discharge liquid or creamy products, comprising a container holding the product to be dispensed, said container having a neck portion with external threads thereon, and comprising a pump housing, a valve chamber, inlet and outlet means in said valve chamber for respective intake and discharge of said product, and two valves arranged in succession in the direction of flow of said product, said valves arranged to close said inlet and open said outlet at the application inside said pump housing of an excess pressure, and to open said inlet and close said outlet at the occurrence inside said pump housing of a partial vacuum, the improvement comprising a sleeve extending up from said valve chamber to receive said externally threaded neck portion of said container, said sleeve having an unthreaded cylindrical inner surface of a diameter to fit snugly over the external threads of said neck portion while leaving grooves on said threads open, means limiting insertion of said neck portion into said sleeve and means at upper and lower ends of said sleeve providing air passages between said sleeve and said neck portion to allow atmospheric air to penetrate into the interior of said container through said air passages and thread grooves to replace said product as it is dispensed from said container.

2. An improved dispensing apparatus as claimed in claim 1, wherein said means limiting insertion of said neck portion of said container into said sleeve comprises circumferentially spaced shoulders in said sleeve engaging the end of said neck portion, said air passages comprising spaces between said shoulders.

3. An improved dispensing apparatus as claimed in claim 1, wherein said neck portion has a short unthreaded portion adjacent said container, and wherein an upper end portion of said sleeve is recessed to provide an air passage communicating with said thread grooves of said externally threaded neck portion.

4. A dispensing apparatus designed to discharge liquid or creamy products, comprising a container holding the product to be dispensed, said container having a neck portion with external threads thereon, and comprising a pump housing, a valve chamber, inlet and outlet means in said valve chamber for respective intake and discharge of said product, and two valves arranged in succession in the direction of flow of said product, said valves arranged to close said inlet and open said outlet at the application inside said pump housing of an excess pressure, and to open said inlet and close said outlet at the occurrence inside said pump housing of a partial vacuum, the improvement comprising a sleeve extending up from said valve chamber to receive said externally threaded neck portion of said container, said sleeve having an unthreaded cylindrical inner surface of a diameter to fit snugly over the external threads of said neck portion while leaving grooves of said threads open for the passage of air to allow atmospheric air to penetrate into the interior of said container to replace said product as it is dispensed from said container, said sleeve having a bottom portion inserted into said valve chamber and having openings in said bottom portion allowing through-flow of said liquid or creamy product to said valve chamber.

5. An improved dispensing apparatus as claimed in claim 4, wherein said bottom portion of said sleeve is in the form of a downwardly convex dome having a plurality of openings therein.

* * * * *